Patented May 10, 1949

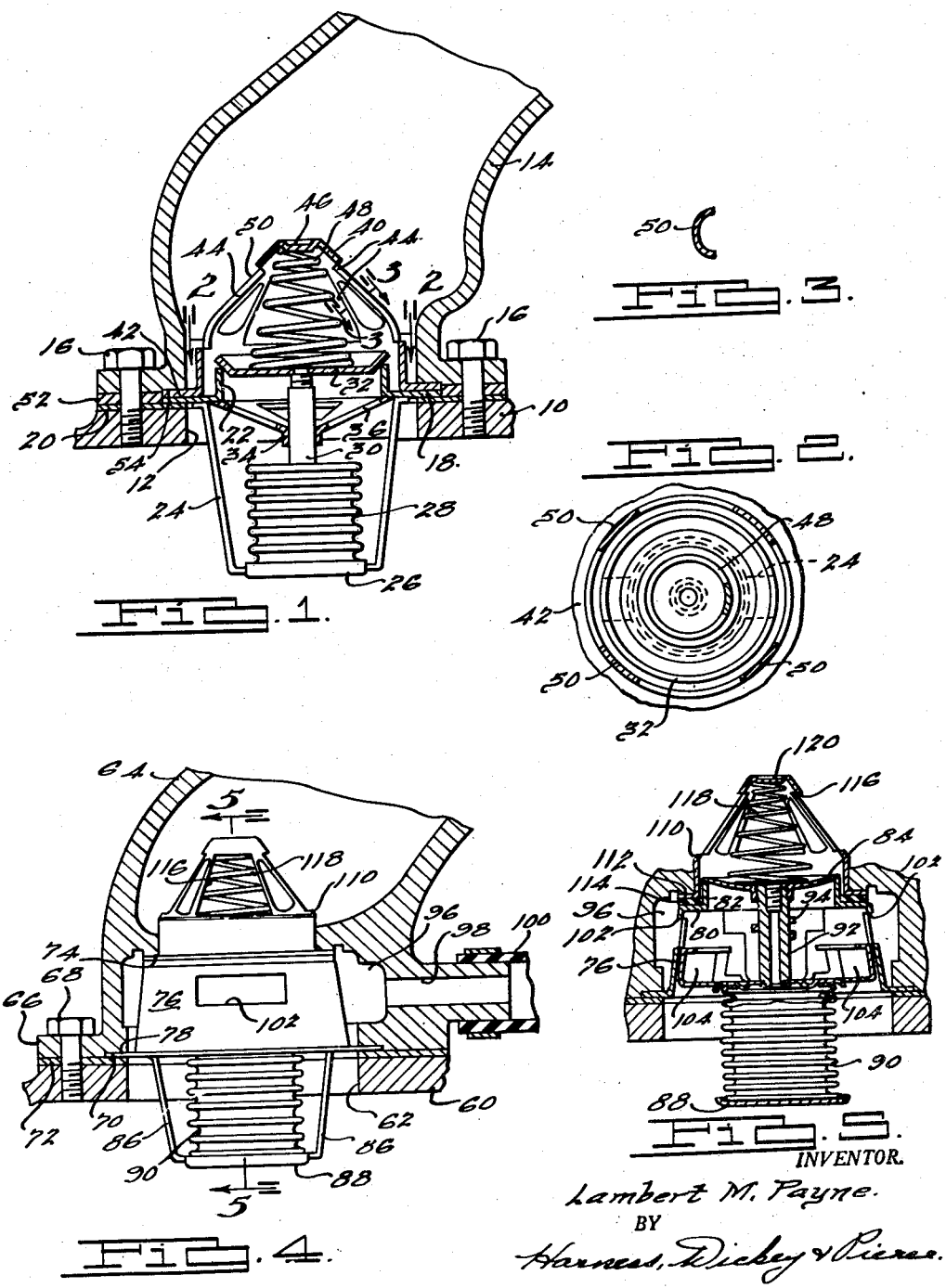

2,469,930

UNITED STATES PATENT OFFICE 2,469,930

AUXILIARY CONTROL DEVICE FOR THERMOSTATIC VALVES

Lambert M. Payne, Detroit, Mich., assignor to L. M. Payne Company, Detroit, Mich., a corporation of Michigan Application March 12, 1945, Serial No. 582,351

2 Claims. (Cl. 236—34)

1

This invention relates to thermostatic valve structures of the type employed for controlling the cooling water temperature in internal combustion engines of the water cooled type and has for its principal object the provision of a simple and inexpensive means by the application of which to and the removal of which from a conventional type of thermostatic valve will automatically adjust the thermostatic valve for winter and summer driving conditions, respectively.

Objects of the invention include the provision of a device which may be applied to and removed from a thermostatic valve of conventional construction employed for controlling the temperature of the cooling water in internal combustion engines for changing the temperature at which the thermostatic valve will open; and provision of a device of the type described that is particularly adaptable for use in connection with thermostatic valves of the poppet valve type.

The above being among the objects of the present invention the same consists in certain novel details of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a vertical sectional view taken centrally through a conventional form of thermostatic valve for controlling the flow of cooling water in an internal combustion engine, together with a fragment of the accompanying engine parts, and illustrating the application of the present invention thereto;

Fig. 2 is an enlarged transverse sectional view taken on the line 2—2 of Fig. 1;

Fig. 3 is a fragmentary, sectional view taken on the line 3—3 of Fig. 1 and illustrating the cross-sectional conformation of the legs of the cage member;

Fig. 4 is a view similar to Fig. 1 but illustrating the present invention applied to a conventional type of by-pass thermostatic valve here shown in side elevation; and, Fig. 5 is a vertical, sectional view taken on the line 5—5 of Fig. 4 centrally of the thermostatic structure there shown.

Referring now to the accompanying drawing

2 and particularly to Figs. 1, 2 and 3 the application of the present invention to a thermostatic valve structure of the bellows actuated type is shown and in connection with a thermostatic valve structure of the type which closes off completely the circulation of the water through the water jackets of the engine when its valve is closed. The numeral 10 indicates the upper wall of the water jacket for the cylinder head of a conventional internal combustion engine and which wall is provided with an opening 12 therein through which the water escapes from the water jacket to the water outlet connection 14. The connection 14 is shown conventionally secured to the cylinder head by means of cap screws 16. It will be appreciated that the water outlet connection 14 is connected by a flexible hose (not shown) to the upper header of a conventional radiator (not shown) through which the water circulates to cool it and from which radiator the water is returned to the water jacket of the engine in cooled condition. Ordinarily a pump (not shown) is provided in the water circulatory system to provide a forced circulation of such water through the engine and radiator.

The conventional thermostatic valve structure shown in Fig. 1 includes a main body portion comprising a flat sheet metal annulus 18 which is clamped between the water outlet 14 and cylinder 10 and normally sealed against leakage by means of a gasket such as 20. The body portion 18 is arranged in concentric relation with respect to the opening 12, and its inner margin in radially inwardly spaced relation with respect to the walls of the opening 12 and the concentric walls of the water outlet 14 is upwardly flanged as at 22 to provide a circular collar, the upper edge of which forms a valve seat. A plurality of straps 24 suitably secured as by staking at their upper ends to the body portion 18 extend downwardly therefrom through the opening 12 into the water jacketed space of the cylinder head and are there connected to the bottom head 26 of a bellows type thermostat 28 which projects upwardly therefrom in concentric relation with respect to the body 18. It will be appreciated that the thermostatic bellows 28 comprises a thin walled bellows containing a suitable amount of liquid which will vaporize at or about the temperature which it is desired to maintain the water within the water jacket of the engine, thereby to place the interior of the bellows under a positive pressure which will cause it to expand in length.

The upper head of the bellows 28 has fixed thereto a concentric upwardly projecting post 30 to the upper end of which a poppet valve 32, preferably formed from sheet metal to the conformation shown, is rigidly secured. The post 30 is preferably of such length that the bellows 28 is required to be stretched or elongated in assembling the structure at normal room temperatures and so that there is a tension in the bellows 28 at normal room temperatures tending to forcefully hold the valve 32 down firmly on its seat at the upper end of the collar 22. Preferably a guide collar 34 is provided for the post 30 above the upper head of the bellows 28 so as to properly guide the valve in its opening and closing movements and the collar 34 is carried by a spider 36 suitably connected at its outer periphery to the body 18 as by staking or the like.

It will be understood that in this case and disregarding the effects of the present invention the valve 32 will remain closed until the water surrounding the thermostat 28 has raised in temperature sufficiently to cause the bellows 28 to expand and open the valve 32, which temperature in conventional thermostats will ordinarily be 155° F. to 160° F. The thermostatic bellows 28 will thereafter control the position of the valve 32 so as to maintain substantially the desired temperature of the cooling water during the continued operation of the associated engine.

In accordance with the present invention and in order to increase the temperature at which the valve 32 will open, an added force is applied to the valve 32 tending to hold it closed so that a greater volume of the liquid within the bellows 28 will be required to be vaporized, in turn requiring it to be subjected to a higher temperature, before it opens the valve 32 against this added force. This added force is applied as follows. A more or less beehive shaped housing or cage 40 of a diameter at its open end in excess of the external diameter of the collar 22 is positioned in surrounding relation with respect to the upper portion of the thermostatic valve structure thus described and it is provided with an outwardly directed annular flange 42, which may be of the same external diameter as the body 18, which is received directly upon the upper face of the body 18 and in concentric relation with respect thereto. It is clamped against the body 18 by the same screws 16 which serve to clamp the body 18 between the water outlet connection 14 and the cylinder head 10. The side walls of the cage 40 are provided with a plurality of apertures 44 therein so as to provide substantially unrestricted flow of the cooling water therethrough. The upper end wall 46 of the housing 40 may be imperforate and downwardly or inwardly offset to provide a pilot and seat for the upper end of the conical compression spring 48 maintained under compression between such end wall and the upper face of the valve 32. The cage 40 is shown in greatly exaggerated thickness and in order to stiffen the relatively narrow arms 50 formed between adjacent openings 44 these arms are preferably formed into a curved cross-sectional configuration as illustrated in Fig. 3.

When applying the cage 40 and the spring 48 to an automobile provided with a thermostatic valve structure of the type described, the cap screws 16 are removed and the water outlet connection 14 removed. The gasket 20 originally provided may be re-used if in sufficiently good condition, otherwise it is replaced. The new gasket 52 is then placed upon the top of the gasket 20 in surrounding relationship with respect to the outer edge of the body 18. The gasket 52 is of a thickness in its free form greater than the combined thickness of the body 18 and the flange 22. The cage 40 with the spring preferably fixed to the top wall 46 thereof in any suitable manner is then applied with the lower end of the spring 48 resting upon the valve 32. It will be appreciated that the spring 48 will hold the flange 42 out of contact with the body 18 until sufficient force is applied to the cage 40 to compress the spring 48 sufficiently to permit contact of these parts. This is preferably accomplished by applying the water outlet connection 14 over the cage 40 and pressing it downwardly into position whereupon cap screws 16 are applied and tightened up to securely clamp the cage 40 in position and to effect a seal of the joint between the water outlet connection 14 of the cylinder head 10. The location of the cage 40 with respect to the water outlet connection 14 is facilitated by the shallow counterbore 54 which is conventionally provided in the lower face of the lower outlet connection 14 concentrically with the opening therein for location of the body 18 where employed alone.

It will be appreciated that in operation the bellows 28 in expanding will not only have to overcome the tension originally provided therein due to elongation in assembly at normal temperatures, but will require development of a sufficient pressure therein to overcome the force of the spring 48. This added pressure is obtained by subjecting the bellows 28 to a higher temperature than that at which it is originally designed to open the valve 32, such added temperature being controlled by the stiffness of the spring 48 and which as above described will ordinarily be such as to require a water temperature around the bellows 28 of approximately 170° F. to 175° F. but which obviously may be such as to control the opening of the valve 32 at any desired temperature higher than the temperature which the bellows 28 is normally intended to open the valve 32.

Thus the device of the present invention consists only of the cage 40 which may be quickly and economically formed from a relatively small piece of relatively thin sheet metal, and the cooperating spring 48. These parts may be manufactured and sold at a fraction of the cost of an entirely new thermostatic valve structure adjusted to operate at a higher temperature than the ordinary thermostatic valve with which an automobile is conventionally equipped, and its effect will be the same as though a new thermostatic valve structure operating at a higher temperature was substituted for the original thermostatic valve structure. At the same time it involves no added movable parts which might foster sticking, involves no adjustment of parts which might be mistakingly operated by the vehicle owner with questionable results, requires no shortening of the hose connecting the water outlet 14 with the radiator, and may be applied and removed fall and spring by the owner without the necessity of employing skilled help.

Where the device of the present invention is applied to a by-pass type thermostat, then substantially the same construction of the invention as illustrated in Figs. 1, 2 and 3 may be employed although in such case it is applied in a slightly different manner, as shown in Figs. 4 and 5.

The upper wall of the water jacket for the cylinder head is here identified at 60 and as having an opening 62 therein corresponding to the opening 12 previously described. The water outlet connection 64 is outwardly flanged as at 66 at its lower end through which flange cap screws 68 project and which are threaded into the cylinder head 60 for securing the water outlet connection 64 thereto. The water outlet connection is provided with a counterbore 70 in its lower face corresponding to the counterbore 54 previously described and a gasket 72 between the matching faces of the water outlet connection 64 and the cylinder head 60. Formed interiorly of the water outlet connection 64 above its lower face and concentrically with the opening in its lower face is an annular seat 74 the purpose of which will be presently described.

In the construction illustrated in Figs. 4 and 5 the main body portion of the thermostatic valve structure comprises a frusto-conical housing 76 provided with an outwardly directed peripheral flange 78 at its lower end which is received in the counterbore 70 and against the gasket 72, this serving as a means for locating and clamping the body 76 in fixed position with respect to the water outlet connection 64 and cylinder head 60. At its upper end the main body portion of the housing 76 is provided with a radially inwardly directed annular wall 80 which terminates at its radially inner margin in an upstanding collar 82 forming a seat for the poppet valve 84. Straps 86 fixed to the main body portion of the housing 76 extend downwardly therefrom and are secured to the lower head 88 of the thermostatic bellows 90 equivalent to the bellows 28 previously described. A post 92 is fixed to the upper head of the bellows 90 and carries the valve 84 at its upper end. The post 92 is guided in the cross-member 94 extending across the main body portion of the housing 76 and fixed thereto.

The upper wall 80 of the main housing 70 is normally sealed to the seat 74 by means of a gasket interposed therebetween thus to seal the space above the seat 74 from the annular chamber 96 surrounding the main body portion 76 between the counterbore 70 and the seat 74. This space is directly connected by means of a passage 98 and flexible tube 100 with the water jacket of the engine at the inlet side thereof. The main body portion of the housing 76 is provided with a pair of ports 102 in the side walls thereof communicating the space interiorly thereof with the chamber 96. The upper head of the bellows 90 is provided with a pair of diametrically opposed valve members 104 which, when the valve 84 is closed, are located below the ports 102 and in radially spaced relation with respect to the interior walls of the main body portion of the housing 76 as illustrated in Fig. 5. However, when the bellows 90 expands to open the valve 84 the valve members 104 in moving upwardly bear against the inner walls of the main body portion 76 about the margins of the ports 102 thus to close them to the flow of water to the chamber 96.

Thus with the construction illustrated in Figs. 4 and 5 when the valve 84 is closed the water which is circulated through the cooling system of the engine by the usual pump flows into the main body portion 76 out through the ports 102 into the chamber 96 and through the passage 98 and flexible connection 100 back to the inlet side of the water jacket and tends to maintain all of the water in the water jacket at the same temperature which, of course, will constantly rise during the time that the valve 84 is closed and the engine is operating. When the temperature of the water increases sufficiently to expand the bellows 90, then the valve 84 will open to permit the water to flow to the radiator and will close the ports 102 thus to prevent the water from recirculating through the engine without passing through the radiator.

In applying the present invention to the construction illustrated in Figs. 4 and 5 substantially the same construction thereof as illustrated in Figs. 1 to 3, inclusive, is employed. In this case the cage here shown at 110 includes a cylindrical lower portion adapted to relatively closely fit the aperture in the water outlet connection 14 which the seat 74 surrounds and it is provided with a flange 112 at its lower edge which seats against the seat 74. A gasket 114 disposed between the wall 80 and the flange 112 serves to maintain the flange 112 against the seat 74 and this joint against leakage. The cage 110 is generally of beehive shape as shown provided with apertures 116 in its side walls for the free flow of water therethrough and a coil spring 118 maintained under compression between its upper wall 120 and the upper face of the valve 84. Thus the application of the present invention to the type of construction shown in Figs. 4 and 5 has identically the same effect as the application of the present invention to the construction shown in Fig. 1 and its operation will, accordingly, be obvious. It may be noted that in this case in applying the present invention to the construction such as illustrated in Figs. 4 and 5 the only change required is the substitution of the gasket 114 for the one previously employed and which previous gasket, of course, may be thicker than the gasket 114 in order to make up for the space which the flange 112 occupies when the present invention is employed in connection therewith and when the flange is of material thickness.

Having thus described my invention, what I claim by Letters Patent is:

1. In an internal-combustion engine of the water-cooled type having a water-outlet connection removably secured to the cylinder head thereof and a thermostatic valve structure for controlling the flow of water through said connection including a member sealed with respect to the walls of said connection and forming a valve seat, a poppet valve in co-operative relation with respect to said seat and a thermostatic element co-operating between said valve and member to control the relative position of the valve with respect to the seat in accordance with the temperature of the water in said passage surrounding said element and tensioned at room temperatures to hold said valve against said seat, the combination of a spring seat member removably fixed in co-operating relation with respect to said seat-forming member and extending into overlying relation with respect to said valve, said spring-seat member being formed for substantially free flow of water therethrough and being provided with an outwardly directed annular flange clamped between a face of said water outlet connection and said seat-forming member, spring means held under compression between said spring-seat member and said valve constantly urging said valve toward closed position.

2. The combination as set forth in claim 1 in which the water-outlet connection is provided with a counterbore in which the flange on the spring-seat member is received.

LAMBERT M. PAYNE.

REFERENCES CITED

The following references are of record in the file of this patent:

UNITED STATES PATENTS

| Number | Name | Date |
|---|---|---|
| 1,486,817 | Wartenberg | Mar. 11, 1924 |
| 1,696,410 | Palm | Dec. 25, 1928 |
| 2,237,766 | Pratt | Apr. 8, 1941 |
| 2,255,543 | Fisher | Sept. 9, 1941 |
| 2,353,610 | Chisholm | July 11, 1944 |
| 2,356,958 | Von Wangenheim | Aug. 29, 1944 |

FOREIGN PATENTS

| Number | Country | Date |
|---|---|---|
| 256,408 | Great Britain | Aug. 12, 1926 |
| 421,900 | Great Britain | Jan. 2, 1935 |